Patented Jan. 23, 1923.

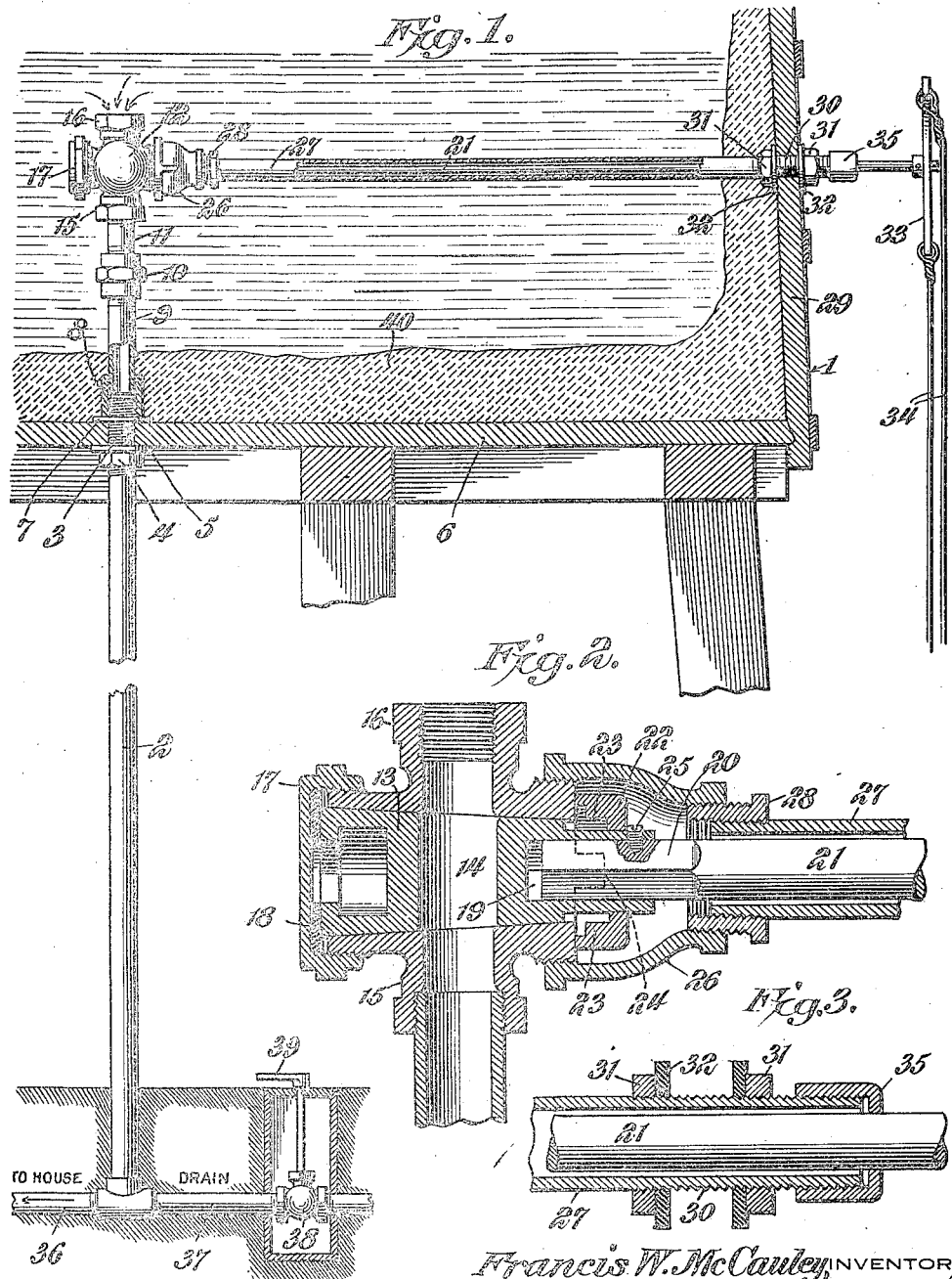

1,443,231

UNITED STATES PATENT OFFICE.

FRANCIS W. McCAULEY, OF GOODES, VIRGINIA.

NONFREEZING ATTACHMENT FOR WATER TANKS.

Application filed December 16, 1918. Serial No. 266,879.

*To all whom it may concern:*

Be it known that I, FRANCIS W. McCAULEY, a citizen of the United States, residing at Goodes, in the county of Bedford and State of Virginia, have invented a new and useful Nonfreezing Attachment for Water Tanks, of which the following is a specification.

This invention has reference to non-freezing attachments for water tanks, and its object is to provide means capable of being readily attached to or detached from the down or discharge pipe of a tank, whereby the down pipe may be readily drained of water in freezing weather without draining the tank and the down pipe may be thereby protected from the effects of freezing and may at any time be put into service.

In accordance with the invention, there is provided a valve and pipe extension whereby the valve may be made fast within the tank to the upper end of the down pipe, and the valve is controlled by means accessible from the exterior of the tank and within the tank is protected from access of the contents of the tank. By locating the valve at a sufficiently high point, freezing of the valve is prevented even though it remains constantly immersed in water.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawings:—

Figure 1 is an upright sectional view, with parts in elevation, showing a tank installation with the invention applied.

Figure 2 is an upright sectional view of the cut-off valve.

Figure 3 is an upright sectional view of the end of the controlling rod remote from the cutoff valve.

Referring to the drawing, there is shown a portion of a tank 1 such as is customarily used for supplying water to houses or other buildings, especially in country districts.

Such a tank is provided with a down pipe 2 having an upper threaded end 3 carrying a lock nut 4 and washer or gasket 5 engaging the underface of the bottom 6 of the tank, while the threaded end extends through and above the bottom of the tank and is provided with a packing washer 7 and usually with a lock nut like the nut 4. The arrangement described is the customary arrangement and may be taken as indicative of any ordinary form of water tank.

In accordance with the invention, the upper lock nut is replaced by a sleeve coupling 8 and into this coupling there is screwed a relatively long nipple 9 carrying a union 10. Into the union there is screwed another nipple 11 and the nipple in turn receives a valve 12.

While no special type of valve is obligatory, a valve such as shown in Figures 1 and 2 may be employed. Such valve is provided with a tapering plug or spigot member 13 fitting an appropriate seat in the valve casing and a passage or port 14 through the spigot is provided to connect a neck 15, into which the nipple 11 is screwed, and another neck 16 opening directly into the interior of the tank.

In the particular form of valve shown in the drawing, the spigot or plug 13 is held in its seat in a water-tight condition by a cap 17 screwed onto the body of the valve and provided with a washer 18 by means of which leakage about the large end of the plug 13 is prevented. The other or small end of the plug has an axial socket 19 therein of square or other suitable cross section to receive a similarly shaped end 20 of a manipulating rod 21. The socket end of the valve plug 13 carries a sleeve 22 having abutments 23 in the path of which are lugs 24 on the valve casing permitting the turning of the spigot valve plug 13 for an appropriate distance, say one-quarter turn, thus in one position bringing the passage 14 into alinement with the necks 15 and 16 and in the other position cutting off communication between the necks 15 and 16. A set screw 25 carried by the small end of the spigot plug 13 and entering the square end of the rod 21 serves the double purpose of holding the rod and spigot member together and preventing the sleeve 22 from escaping.

Screwed onto that end of the valve casing remote from the cap 17 is a coupling 26, which, in the particular showing of the drawing, is in the form of a reducing coupling enclosing the small end of the spigot plug 13 and the sleeve 22, and at its small end receiving one end of a pipe 27 through the intermediary of a bushing 28. It will be understood, of course, that by suitably proportioning the parts the bushing 28 may be omitted.

The pipe 27 and the coupling 26 are together of sufficient length to reach to and through the side wall 29 of the tank 1, the pipe 27 where extending through the side wall 29 being suitably threaded, as shown at 30, and there is provided with lock nuts 31 and washers 32, whereby a water-tight joint about the pipe 27 may be provided where the pipe 27 extends to the exterior of the tank. The rod 21 is of sufficient length to reach from the socket 19 through the pipe 27 of the exterior of the tank and beyond the outer end of the pipe 27. At the outer end of the rod 21 beyond the corresponding end of the pipe 27 there is secured to the rod a rock arm 33 to opposite ends of which strands 34 are applied, these strands extending to some accessible point whereby the rod 21 may be rocked to such an extent as to open or close the valve 12. A centering cap or sleeve 35 is screwed onto the threaded end 30 of the pipe 27 outside of the tank to serve as a journal support for the rod 21.

The down pipe 2 is continued to a point sufficiently far under ground to be below the freezing line and there the pipe may lead by a branch 36 to a house or other building to be supplied with water from the tank and the strands 34 may also be carried to the house or any other suitable point for manipulation. Another branch 37 leading from the down pipe 2 is provided with a valve 38 permitting water from the pipe 2 and from the pipe 36 to be directed to a drain or other point of disposal. To prevent freezing the valve 38 is buried sufficiently far under ground and a manipulating handle 39, at an accessible point, may be provided for the opening and closing of the valve 38.

When the attachment is installed it is of course necessary to drain the tank 1 to an extent permitting the boring of a hole through the side of the tank for the pipe 27. The valve 12 is placed at a high enough point within the tank to be above the lower freezing line in the tank, ice, indicated at 40 in Figure 1, accumulating at the sides and bottom of the tank as well as on the surface of the water in the tank.

In most localities ice does not form on the bottom of the tank to a greater depth than twelve inches, so that in such localities the valve 12 may be located at or somewhat more than twelve inches above the bottom of the tank and the pipe 21 emerges from the tank at about the same height. There is, of course, a certain depth of water at all times in the bottom of the tank when the attachment is applied but such depth of water is not material, since with the tank six or eight feet more in height a decrease in effective depth of the tank during the cold season is of no great moment.

During those seasons of the year when freezing does not occur the valve 12 is disconnected from the pipe 2 by unfastening the union 10 and then the nipple 9 and sleeve 8 may be removed from the upper end of the pipe 2 and a lock nut may replace the sleeve 8, thus permitting the utilization of the full depth of the tank. It is not necessary to remove the valve 12 or the pipe 27. Water does not enter into the pipe 27 and even should freezing occur as high as the pipe 27, no harm can come to the rod 21 and no impediment is offered to the turning of the spigot 13 by the rod 21.

When the water is turned off at the valve 12, the valve 38 is opened, thus permitting water in the pipe 2 to drain off, such draining being also effective to the house or other building supplied from the tank. There is therefore no water within the pipe, where freezing may and usually does occur, to congeal. In this way a householder may, at night, drain the entire system without leaving the house, with the assurance that the water in the supply tank is not wasted and the water pipes are drained and therefore protected, with the further assurance that, when needed, water is available. In order to obtain water in the house it is only necessary to manipulate the strands 34 to turn on the valve 12 after the valve 38 has been closed, whereupon the down pipe 2 and the house pipes will fill so that water may be used. The valve 38 may be controlled within the house so that it is not necessary for the householder to go out of doors to turn off the water and drain the pipes or to turn off the drain valve and turn on the water from the tank to the house as desired.

It is customary in cold climates to protect the down pipes by suitably encasing them but such arrangement is often inaffective and even when the down pipes where encased do not freeze, freezing will occur at the inlet end of the pipe 2 where close to the bottom of the tank because of the accumulation of ice on the inner surface of the bottom of the tank, sometimes covering over the upper end of the pipe 2 where not carried sufficiently high into the tank, as by the attachment of the invention.

It will be found advantageous under some circumstances to permit the installation to remain at all times in the tank in its complete form. In some localities the water directed into the tank deposits considerable sediment and the height of the valve and its intake above the bottom of the tank leaves ample room for accumulation of sediment through long periods of time. Under such circumstances cleansing of the tank is necessary only at infrequent intervals instead of repeated cleansing at short intervals as becomes necessary where the inlet end of the down pipe is close to the bottom of the tank. While the invention has been described more particularly as applied to outdoor tanks for houses, it will be understood that it is also useful in connection with railroad and other tanks.

What is claimed is:—

1. A cut-off attachment for elevated water tanks liable to freezing, comprising a rotary spigot valve, piping within the tank supporting the valve and connecting it to the upper end of the down pipe of the tank and of a length to elevate the valve above the freezing line at the bottom of the tank, said piping and valve being removable from the upper end of the down pipe without disturbing the latter, a horizontal operating rod connected to the valve and extending laterally through the side of the tank to the exterior thereof, means for excluding water in the tank from the ends of the spigot member and an inclosing pipe for the rod extending laterally from the valve to the exterior of the tank in water-excluding relation to said rod.

2. A cut-off attachment for elevated water tanks liable to freezing, comprising a rotary spigot valve located within the tank, piping within the tank carried by the upper end of the down pipe of the tank and in turn carrying the valve, both the piping and the valve being bodily removable from the upper end of the down pipe without disturbing the latter, and the piping being of a length to elevate the valve above the freezing line at the lower end of the tank, an operating rod for the valve extending laterally through the side of the tank to the exterior thereof, means for protecting the operating rod and the ends of the spigot member from access of water, and means for opening and closing the valve by the operating rod.

3. A cut-off attachment for elevated water tanks liable to freezing, comprising an upright valve casing with a substantially horizontal rotary spigot member, an upright pipe supporting the valve and rising and separable from the down-pipe of the tank and of a length to elevate the valve above the freezing line at the bottom of the tank, packing means on the valve casing at one end of the spigot member an operating rod connected at one end to the other end of the spigot member in axial alinement therewith and extending laterally through and from the side of the tank, an enclosing pipe for the rod connected in a water tight manner to the valve casing and extended in a water tight manner through the side of the tank to exclude water from the operating rod, and operating means for the rod exterior to the tank and extending to a point of access at a lower level than the tank.

4. A cut-off attachment for elevated water tanks liable to freezing, comprising a rotary spigot valve and casing within the tank, piping within the tank connecting the upper end of the down pipe of the tank and the valve casing and elevating the valve above the freezing line at the bottom of the tank, said piping including a separable member for disconnecting the valve from the down pipe, means for excluding water from the ends of the spigot member and an encased operating rod extending laterally from the valve through the side of the tank.

5. A cut-off attachment for elevated water tanks liable to freezing, comprising a rotary spigot valve and casing and supporting pipe therefor including a union coupling, the valve, coupling and piping being located within the tank with the valve above the freezing line at the bottom of the tank, and the piping connecting the valve to the upper end of the down pipe of the tank, means for excluding water from the ends of the spigot member and operating means for the valve protected against access of water in the tank and extending laterally through the side of the tank to the exterior thereof.

6. A cut-off attachment for elevated water tanks liable to freezing, comprising an upright valve casing with a substantially horizontal rotary spigot member, a substantially horizontal pipe secured to the valve casing in line with the small end of the spigot member, packing means on the valve casing at the large end of the spigot member, and an operating rod connected to the small end of the spigot member and extending through the horizontal pipe and through the side wall of the tank for access exterior to said tank without permitting access of the water to the spigot operating rod.

7. A cut-off attachment for elevated water tanks liable to freezing, comprising a valve for controlling the out flow of water from the tank, a piping support for the valve having means for attaching the piping to the down pipe of the tank within the latter with the valve elevated above the freezing line at the bottom portion of the tank, a pipe connected at one end to the valve and at the other end extending through the side of the tank to the exterior thereof, and a manipulating rod for the valve extending through the pipe and connected to the movable member of the valve and provided at its outer end with means for the manipulation of the rod, the piping supporting the valve including a union fitting whereby the valve may be separated from the down pipe of the tank without disturbing the valve or the pipe reaching therefrom to the side of the tank.

8. A cut-off attachment for elevated water tanks liable to freezing, comprising a valve casing with upright and horizontal branches, a rotary spigot member mounted in the horizontal branch, packing means at one end of the spigot member, an operating rod connected to the other end of the spigot member and extending through the adjacent wall of the tank to the exterior thereof, a pipe connected to the horizontal member of the valve casing and extending to the adjacent side wall of the tank and through the latter to the exterior thereof and traversed by the operating rod, manipulating means for the rod accessible at a point below the level of the tank and a supporting pipe for the valve casing constituting a part of the down-pipe of the tank and rising therefrom and including a separable connection whereby the cut-off may be wholly disconnected from the down-pipe without interference with the function of the down-pipe.

9. A cut-off attachment for elevated water tanks liable to freezing comprising a spigot valve casing, a spigot valve member mounted in the casing, an operating rod connected to the small end of the spigot valve and extending substantially horizontally to and through the adjacent side wall of the tank, a support for the spigot valve mounted on the down-pipe of the tank and separable therefrom, and means excluding the water in the tank from the operating rod and from both ends of the spigot member.

In testimony, that I claim the foregoing as my own, I have hereto affixed my signature.

FRANCIS W. McCAULEY.